(12) United States Patent
Brown et al.

(10) Patent No.: US 7,521,001 B2
(45) Date of Patent: Apr. 21, 2009

(54) SURFACE TREATMENT OF CONCRETE

(75) Inventors: Stephen Christopher Neil Brown, Manchester (GB); Julian Timothy Spencer, Manchester (GB); Andrew William Benjamin, Warrington (GB); Tristan Goronwy Thomas, Warrington (GB)

(73) Assignee: Nuclear Decommissioning Authority, Calderbridge, Cumbria (GB)

( * ) Notice: Subject to any disclaimer, the term of this patent is extended or adjusted under 35 U.S.C. 154(b) by 326 days.

(21) Appl. No.: 10/529,224

(22) PCT Filed: Sep. 26, 2003

(86) PCT No.: PCT/GB03/04103

§ 371 (c)(1),
(2), (4) Date: Jun. 28, 2005

(87) PCT Pub. No.: WO2004/028712

PCT Pub. Date: Apr. 8, 2004

(65) Prior Publication Data
US 2006/0151431 A1    Jul. 13, 2006

(30) Foreign Application Priority Data
Sep. 26, 2002 (GB) ................... 0222341.0

(51) Int. Cl.
*C23F 1/00* (2006.01)
(52) U.S. Cl. ...................................... 216/96
(58) Field of Classification Search ......... 216/94, 216/85, 96, 60, 65, 95; 510/110, 109, 146, 510/150, 157; 113/113, 122, 146, 150, 157; 134/22.1, 42, 32; 250/492; 438/707, 746, 438/795, 906
See application file for complete search history.

(56) References Cited

U.S. PATENT DOCUMENTS

| | | | | |
|---|---|---|---|---|
| 4,169,976 A | * | 10/1979 | Cirri | 219/121.72 |
| 4,670,639 A | * | 6/1987 | Behn | 219/121.69 |
| RE33,931 E | * | 5/1992 | Whitney | 355/53 |
| 5,256,848 A | | 10/1993 | Cartry et al. | |
| 5,368,900 A | * | 11/1994 | Jelley et al. | 427/555 |
| 5,538,764 A | | 7/1996 | Lin | |

(Continued)

FOREIGN PATENT DOCUMENTS

EP    0 642 846    3/1995

(Continued)

OTHER PUBLICATIONS

L. Li, "The potential role of high—power lasers in nuclear decommissioning", pp. 103-115 of Imeche Conference Transactions, Nuclear Decom (2001) Ensuring safe secure, and successful Decommissioning (ISSN: 1356-1448).*

*Primary Examiner*—Michael Cleveland
*Assistant Examiner*—Tabassom Tadayyon Eslami
(74) *Attorney, Agent, or Firm*—Dennison, Schultz & MacDonald

(57) ABSTRACT

A method of treating a surface for the removal of a surface portion comprising irradiating the surface with laser light, wherein the irradiation is effected by covering said surface in a sequential manner with a plurality of discrete spots of laser light. The spots of laser light overlap and may be arranged in a geometric arrangement defined by the locations of the centers of the spots of laser light. The spots of laser light may be applied sequentially.

9 Claims, 4 Drawing Sheets

U.S. PATENT DOCUMENTS 5,790,620 A * 8/1998 Okazaki et al. ............. 376/305
6,450,180 B1 * 9/2002 Zahavi et al. ................ 134/1.3

FOREIGN PATENT DOCUMENTS

| | | |
|---|---|---|
| FR | 2 760 403 | 9/1998 |
| GB | 2 316 528 | 2/1998 |
| WO | 97/48536 | 12/1997 |

* cited by examiner

PRIOR ART

SURFACE TREATMENT OF CONCRETE

This application is a 371 of PCT/GB2003/004103 filed on Sept. 26, 2003.

FIELD OF THE INVENTION

The present invention concerns surface removal from inorganic non-metallic structures, in particular concrete structures, primarily though not exclusively for the purpose of removing radioactive contamination contained in surface layers.

DISCUSSION OF THE PRIOR ART

In the nuclear industry surfaces of concrete structures may become contaminated with radionuclides. Common contaminants include uranium oxide, plutonium oxide, strontium-90, caesium-137 and cobalt-60. Typically this contamination is only present in a surface layer of concrete. Such layers may be around 1 to 4 mm or more in thickness. By removal of such a surface layer the degree of contamination of a surface and of the structure as a whole may be greatly reduced. However, simple mechanical methods may be unsuitable for use where a potential for contamination makes it desirable for an operator to be remote from a surface to be operated upon.

Various techniques are known for the surface removal of concrete, stone and similar surfaces. One such method is the heat treatment of a surface such as to degrade that surface and release a surface layer.

JP 3002595 describes the removal of a concrete surface layer by crushing due to the heat generated by the use of microwaves to irradiate a contaminated surface layer.

GB 2316528 describes a process for decontaminating a surface using a pulsed laser beam. Pulsed laser beams emit very high energy in very short pulses. The document describes pulses of 28 ns duration, and a maximum repetition rate of 250 Hz (i.e. a pulse every 4 ms), hence the time between pulses is approximately 140,000 times that of the duration of each pulse. Such high energy pulses often have peak power densities per pulse which are of the order of several tens of MW/cm$^2$, but which only last for the duration of the pulse. Such high peak power densities give rise to ablative processes, such as vaporisation, sublimation or plasma formation, to effect removal of a very thin surface layer. Pulsed laser processes are characteristic in that the time interval between the very high energy, short pulses is several orders of magnitude longer than the duration of each pulse. This gives a very high instantaneous energy intensity during the short duration of each pulse, but a lower power density when the output is averaged continuously over time.

EP-A-0653762 describes a method, termed scabbling, of modifying concrete by ejecting solid surface fragments, chips or flakes of material of significant size (e.g. several grams) and volume, thus causing surface removal. In the method described a laser is used which is scanned across the surface in a raster scan. In such a method energy from the laser light heats the surface and causes surface fragments to break away or be ejected, often violently, due to the generation of either steam or thermal stresses below the surface. This latter phenomenon of ejecting solid surface fragments, chips or flakes of material by use of a laser is known in the art as laser scabbling.

However, it has been found that some surfaces, including some types of concrete having aggregate therein, whilst able to be successfully laser scabbled on a first scan of the laser beam over the surface, may fail to scabble, or do so only with reduced efficiency, on areas which are either within or adjacent to a first scanned track when subjected to laser irradiation on either a subsequent re-treatment of the same area or on an adjacent scanned track.

SUMMARY OF THE INVENTION

According to the present invention there is provided a method of treating a surface for the removal of a surface portion comprising the step of irradiating the surface with laser light, characterised in that the irradiation is effected by covering said surface in a plurality of discrete spots of laser light each having an average power density over the area of the spot of up to 200 W/cm$^2$.

The locations at which the laser is applied in the aforesaid, optionally sequential, manner may be defined by the centres of the spots of laser light. The spots of laser light may overlap. The geometry of each spot of laser light at the point of application on the surface may be circular, ovoid, ellipsoidal, rectangular or square dependent on the shape of the emitted laser beam and any modification of it by intervening optical elements.

A laser used for laser scabbling has a substantially continuous, rather than pulsed, output, although the laser may optionally be switched off during the periods of movement of the laser deployment system between the spot locations.

The spots of laser light are typically several tens of millimetres in diameter at the point of application on the element of the said surface and each spot is held stationary over the element of the surface being treated for a period of seconds to tens of seconds before the laser is moved to the next application point.

The spots of laser light may be applied sequentially.

The method of the invention, of laser scabbling using spots of laser light, significantly reduces the creation of areas treated by the laser light which subsequently resist further laser scabbling treatments, when compared to other known methods of applying laser light of substantially continuous power. In addition the method results in a flatter scabbled surface than with other known methods of laser scabbling.

The method of the invention, of laser scabbling using spots of laser light, requires an average power density on the surface at the point of application of a spot, i.e. per spot, of laser light of above 30 W/cm$^2$ or thereabouts and below around 200 W/cm$^2$ or thereabouts.

Above an average power density of around 200 W/cm$^2$ the concrete may scabble for a short time, but this will usually result in melting of the concrete matrix which hinders further scabbling. Below an average power density of around 30 W/cm$^2$ the threshold energy intensity, which gives a heating rate sufficient to cause scabbling is unlikely to be reached.

A preferred average power density range for laser scabbling according to the invention is 50 W/cm$^2$ to 150 W/cm$^2$. An average power density per spot of laser light found to produce optimum scabbling results is of the order of 100 W/cm$^2$. The precise optimum average power density used will depend upon the characteristics of the surface to be scabbled such as concrete type, reflectivity etc.

The term average power density refers to power as averaged over the area of a spot of laser light. This is in contrast with a power density as averaged over time, which is not meant.

The scabbling of a concrete surface by a laser of substantially continuous power may be compared to the treatment of a surface by the pulsed laser typically used in ablative processes, and the resulting effects are significantly different. When scabbling by applying the continuous laser to the element of surface being treated for a duration of seconds or tens of seconds, the heat has sufficient time, and therefore the opportunity, to diffuse below the surface and build up the stresses and/or steam in an appreciable volume of material, resulting in the ejection of solid fragments, chips or flakes of material of significant size. However, when using a pulsed ablative system, because of the short duration of the laser pulses (nanoseconds to milliseconds) in relation both to the interval between the pulses and to the time taken for heat to diffuse below the surface of the concrete, the energy input from the short pulses is of insufficient duration to heat the concrete beneath a very thin surface layer. Thus neither mechanical stresses nor steam can build up within a significant volume of material below the surface layer, and scabbling by ejection of solid fragments, chips or flakes of the material cannot therefore occur.

The energy delivered to a surface per spot of incident light in laser scabbling, which uses a laser of substantially constant intensity, lies between approximately 200 and 1350 $J/cm^2$, compared to around 0.7 $J/cm^2$ for an ablative system, with a pulsed laser. The time over which a spot of laser light energy is delivered in laser scabbling is in the order of 1 to 30 seconds for the present invention. The equivalent time for ablative systems using a pulsed laser is typically in the order of 20 ns.

The power density of a typical spot of laser light required for scabbling in the mode of the present invention, which is tens or hundreds of $W/cm^2$, is many orders of magnitude lower than that required for ablative processes such as are typical for pulsed laser treatment which is in the order of several tens of $MW/cm^2$ The use of pulsed laser ablative processes would often be considered disadvantageous for the removal of radioactive contaminants, as either the creation of plasmas or the vapourisation or sublimation of contaminants would lead to further airborne spread of contamination. Scabbling avoids these problems because relatively large (mm to cm) and solid surface fragments, chips or flakes are forcibly ejected from a surface being scabbled and can be readily collected using conventional solids collection methods, such as air extraction and filters.

However, problems have been found in the prior art with surface removal by laser scabbling which are associated with a non-uniform power distribution, for example, quasi-Gaussian, across a laser beam spot, and in particular with the presence of lower power density regions of an incident beam of laser light on the surface to be treated. The part of a beam of laser light incident upon a surface that is above a critical, or threshold, power density able to effect scabbling causes scabbling of the surface to occur. Any part of an incident laser beam, usually a peripheral part, which is below that threshold power density level, i.e. a part not subjecting a surface portion on which it is incident to a power density above a critical value, does not give rise to surface removal by scabbling, but the element of the surface treated by it is nevertheless heated. Such heating without scabbling may cause a number of processes to occur in the material, such as relaxation, dehydration and chemical change. These processes can result in the heat-affected surface no longer being amenable to subsequent surface removal by laser scabbling, even when that subsequent treatment is above the threshold power density to achieve scabbling. That is at least when laser light is used in a manner whereby surface removal would otherwise be effected by scabbling, i.e. the ejection of surface chips, rather than by ablation.

Furthermore a non-uniform power distribution across a laser beam incident upon a surface may result in differential surface removal by scabbling between surface portions where a highest and a lower laser power density, both of which are above the threshold power density, are incident. For this reason, when linearly scanning or tracking a laser beam at a constant speed across a surface in order to scabble it, a furrow, or channel with sloping sides may be formed in a surface by a scanned laser beam impinging perpendicular to a surface. A subsequent scabbling attempt adjacent to this track by a similar perpendicular beam may result in laser light impinging upon that sloping surface portion resulting in a lower incident power density on the sloping surface area. The sloping sides may therefore cause an otherwise sufficient power density to either become insufficient; i.e. to fall below the threshold power density, or to scabble less surface material because of reduced power density and therefore reduced scabbling efficiency. As a result a whole surface when scabbled using laser light may be uneven.

In addition, laser scabbling processes may cause explosive detachment of surface fragments of a material being treated, as in the scabbling of concrete. To overcome potential shrapnel damage to the laser and associated optics, laser beams may be focussed through a relatively very small aperture before defocusing to form the spot. A high velocity stream of air may also be ejected under pressure from this aperture so as to prevent ingress of debris. Such focussing and defocusing may serve to increase the divergence of a laser beam, due to the surface to be treated being remote from the focus, and induce or increase a spread of power density within a spot of incident laser light.

The use of spots, particularly overlapping spots, particularly sequential, of laser light to scabble a surface has been found to reduce the proportion of the treated surface which is treated by peripheral parts of a laser beam, i.e. in which scabbling is inhibited because the power density of the laser does not reach the threshold for causing scabbling for the appropriate duration, and which may therefore inhibit further surface removal. Surprisingly, it has been found that whilst the area subjected to a lower incident laser beam power density, i.e. a power density below a critical threshold, is increased using the method of the invention as compared to a linearly scanned laser beam, the efficiency of surface removal is increased and a more even scabbled surface results.

Said plurality of spots of laser light may be arranged in a geometric arrangement. The geometric arrangement may be defined by the arrangement of the locations of the centres of the spots of laser light.

A centre of a spot of laser light may be defined as the geometric centre of the spot of incident laser light. A centre of a spot of laser light may be the highest power density region of an incident spot of laser light.

The geometric arrangement of a plurality of spots of laser light may be that of a simple geometric figure. Suitable simple geometric figures include triangles, rectangles, rhombi, pentagons, hexagons and the like. The simple geometric figure is preferably an equilateral triangle. The simple geometric figures may be tessellated, that is fit together exactly to cover a surface without gaps between the figures. The spots of laser light may be arranged as a series of geometric arrangements, such as a series of triangles, so that an array of spots of laser light is described on the surface by the method.

The extent of the overlap of overlapping spots of laser light may be such that for a given geometric arrangement, full coverage of the area within the whole spot pattern occurs during one treatment cycle. I.e. no area not, at one time during use of the method, exposed to laser light is present between the locations at which the spots of laser light are applied.

The spots of laser light may be ovoid. The spots of laser light may be ellipsoidal. The spots of laser light may be square or rectangular. The spots of laser light may be circular. The width of a spot of laser light may be a diameter of an incident spot of laser light. That width may be defined as that diameter of the spot exceeding a threshold power density level for scabbling. In one embodiment of the method of the present invention the distance between the centres of the spots of laser light may be in the range 4/7 to 6/7, and preferably 5/7 (71%) of a spot diameter measured as that diameter of the spot exceeding a threshold power density level for scabbling.

A spot of laser light may be defined as an area of laser light incident upon a surface, wherein the area is an area in which the laser light is above a threshold power density level for causing scabbling. The diameter of a spot of laser light may be a diameter of that area of a spot of laser light in which the laser light is above a threshold power density level for causing scabbling.

In one embodiment of the present invention using a variable output YAG laser of up to 4 kW power the total diameter of an area of a surface upon which incident laser light falls may be from 20 mm to 250 mm in diameter and more preferably from 30 mm to 130 mm in diameter. In such an embodiment the width of the spot of laser light which is above the threshold power density level to cause scabbling, may correspondingly be from 30 to 80 mm, or from 50 to 75 mm in the preferred range. In general, larger spot sizes are preferred as they give more reproducible results.

If sequential spotting of laser light is used the time interval between successive spots of laser light may typically be between 0.1 s and 2 s. The time interval between each successive spot of laser light being applied may be substantially equal.

The time of irradiation of a surface location for any given spot of laser light may typically be between 1 s and 30 s. The time of irradiation for each successive spot of laser light applied may be substantially equal.

The duration of irradiation of a surface location for any given spot may be longer than the time interval between subsequent spots of laser light, preferably more than 5 times longer and most preferably 10 or more times longer.

The ratio of the spot treatment duration to the time interval between successive treatment spots in the case of laser scabbling is therefore over one million times more than is typical for a pulsed laser as described, for example, in GB 2316528. The time delay between adjacent spots when using the method of the invention is dictated primarily by the traversal speed of the laser deployment device, such as a robot arm optionally the laser may remain switched on during the traverse motion. Whereas in the case of a pulsed laser system the delay between pulses, typically less than 0.005 s, is required to allow the laser to 'charge' and for the power to build up to the required level.

The average power density found in the method of the invention to produce optimum scabbling results for a Portland cement based concrete surface is of the order of 100 W/cm$^2$, based upon sequential spotting of laser light using a 70 mm diameter spot, and a treatment time of 15-20 seconds per spot with a 3 kW YAG laser. The average power density used will increase when using smaller spots, and may be nearly double when using a 40 mm diameter spot of light from an equivalent laser, with a corresponding decrease in treatment time to approximately 3 seconds. The optimum average power density and duration chosen for a spot of laser light represents a trade off between the proportion of the spot surface area which is above the threshold power density for scabbling, the desired removal rate and the desired removal efficacy (e.g. no melting, or no creation of adjacent areas potentially resistant to scabbling), among other factors.

Any suitable method of creating individual spots of laser light for laser irradiation may be used. A continuous laser beam may be interrupted by a shutter or the beam may be turned on and off. More than one laser source may be used.

Any suitable method for moving the individual spots of laser light relative to the material being scabbled may be used including moving the laser, moving the object to be scabbled, moving a laser light conduit (such as a fibre-optic cable) or the employment of optical methods such as mirrors and the like. It is optionally within the scope of the invention to move a beam, without turning it off, at such a velocity that the beam has a negligible residence time between individual spots of laser light in proportion to the treatment time for each spot, such that individual successive incident spots of laser light are effectively created.

The spots of laser light irradiation for use in the invention may have an uneven power density within the area of a spot.

A laser light source for use in the invention may typically be of total continuous power from 0.5 kW to 4 kW. Despite optionally being turned off during the motion between spots, this power is delivered substantially constantly over time. The laser is therefore not a 'pulsed laser' in the sense used in the technical field of laser technology.

A threshold power density for surface removal by scabbling for concrete may typically be in the range of 50 W/cm$^2$ to 80 W/cm$^2$ depending upon the surface to be treated, i.e. a value of 70 W/cm$^2$ or thereabouts.

The power of the laser, the size of the incident spot of laser light and the residence time of the spot of laser light are interrelated and for any given surface will be optimised so as to achieve the most effective surface removal. The interrelationships of the above factors are governed by established physical laws known to persons skilled in the art.

A suitable laser source may be a Yttrium Aluminium Garnet (YAG) laser, a diode laser array or a fibre laser. The beams of laser light sources for use in the invention may, have a non-uniform power density in cross-section.

A range of different removal depths is obtainable in a single pass of an array of laser beam spots. A single treatment spot can remove anywhere between 1 and 30mm of material at the deepest point. However, this depth will generally not be consistent across each treatment spot, typically showing a crater type geometry particularly with deeper scabbling. It has been found that concrete removal depths of about 1 mm to 30 mm may be achieved on a surface, the coverage of which is carried out using a single array of spots of laser light according to the method of the invention.

Multiple passes each comprising an array of spots of laser light may be applied subsequent to one another to a surface to achieve a greater depth of surface removal by removing several layers of material in a sequential manner. The array of spots of laser light for subsequent irradiations may be placed out of alignment with a previous array. The location of spots of laser light, of sequential arrays applied to a given area may optionally be placed at the interstices of previous arrays, so as to define a three dimensional matrix.

The laser beam may be transmitted to a delivery head by means of a fibre optic cable. The laser beam may be alternatively described as laser light or laser radiation.

A delivery head for projecting a laser beam onto a surface to be treated may comprise focussing optics to focus the beam through a focal point. The optics may include means for changing the direction of the laser light through a right angle. The beam and any optics may be shrouded up to the focal point. The shroud may be frusto-conical. After the focal point the beam may diverge before impinging upon a surface to be treated. The surface to be treated may be 270 mm from the focal point when optics of focal length 120 mm are used giving a spot of incident laser light of around 70 mm diameter on the surface to be treated.

Suitable laser equipment for practising the invention is supplied by TRUMPF GmbH and Co. KG. of Stuttgart, Germany. The laser delivery head may be deployed and guided by a robotic arm.

The laser beam may effect surface removal by the effects of thermal shock. The method of the invention may give no or negligible surface removal by melting or vaporisation of the surface being treated.

The method may comprise a step of wetting the surface to be treated before irradiation with the laser beam.

The method may comprise a step of coating the surface to be treated before irradiation with laser light. Examples of suitable coatings are described in EP 0 653 762 A1.

The presence of radionuclides may affect the nature of the scabbling process and the adsorption or absorption of incident laser radiation.

The method of the invention may typically be used for decontamination in conjunction with fume extraction, dust or solids collection and other subsidiary protective processes to prevent the spread of any contamination, particularly where radioactivity is involved.

The surface for treatment according to the method of the invention may be an inorganic non-metallic surface such as a concrete, i.e. a cement, e.g. a Portland cement matrix having aggregate therein. The surface may alternatively comprise a natural stone such as limestone, for example, or an engineered ceramic material such as brick.

BRIEF DESCRIPTION OF THE DRAWINGS

In order that the present invention may be more fully understood, examples will now be given by way of illustration only, with reference to the accompanying drawings, in which:

FIG. 5 shows schematically detail of the example shown in FIG. 4 of a pattern of laser light irradiation in accordance with the present invention shown in;

In the accompanying figures like features are denoted by like reference numerals.

DESCRIPTION OF PREFERRED EMBODIMENTS OF THE INVENTION

Figure 1:
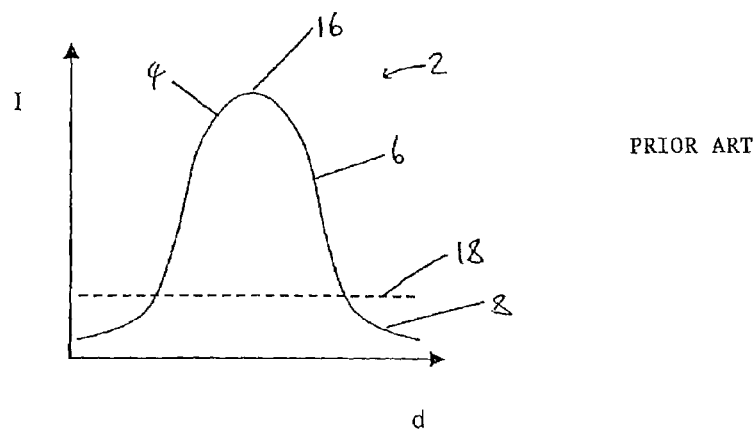
FIG. 1 shows a schematic representation of power density across the width of a laser beam.

A beam of laser light may be non-uniform in power density across a width of the beam. A schematic representation of power density across a laser beam is shown in FIG. 1. FIG. 1 depicts a graph 2 with a y axis of laser power density (I) and an x axis of distance (d) across the beam. The curve 4 describes a quasi-Gaussian type power distribution from which it may be seen that the laser beam has a central area 16 of highest power density. The curve may be divided into two portions, the boundary between being defined by a threshold power density level 18. A portion 6 of the curve 4 above this power density threshold represents part of the laser beam capable of giving rise to scabbling of a surface, the portion 8 below represents an area not capable of giving rise to scabbling of such a surface. However, the low power density portion 8 may give rise to surface modification which makes the surface resistant to scabbling by subsequent passes with a laser beam, even if that subsequent beam has a power density above the threshold 18.

Figure 2:
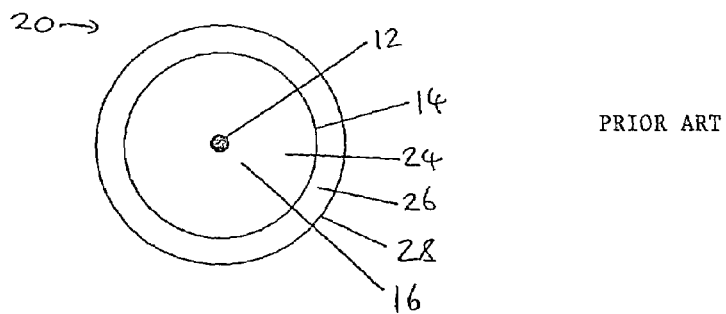
FIG. 2 shows a schematic representation of an incident spot of laser light.

FIG. 2 depicts a representation of a laser beam, of uneven power density, such as described in FIG. 1 when impinged, orthogonally, upon a surface. The surface, such as one to be scabbled, is represented here and in other diagrams by the plane of the paper. The spot of laser light 20 comprises a centre 12 of highest power density and an immediately surrounding area 16 of high power density. The centre point 12, and area 16, forms part of area 24 wherein the light is above a threshold power density 18 for scabbling. Towards the periphery of the spot of laser light scabbling may be less effective (i.e. less material may be removed) until a boundary 14 is reached which corresponds to the threshold power density 18 for effecting scabbling. A further area 26 of low incident power exists between the first boundary 14 and a nominal outer boundary of the beam and is described by line 28 beyond which point incident power is very low, such as may be due to scattering, for example.

Figure 3:
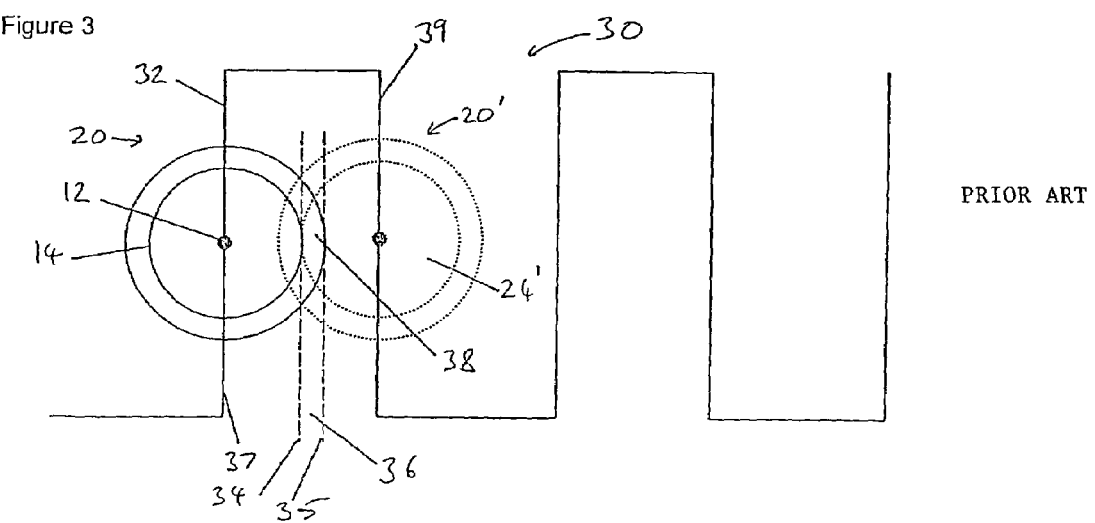
FIG. 3 shows schematically a known method of laser scabbling comprising scanning a laser beam over a surface to be scabbled.

In the prior art an incident spot of laser light may be used to scabble a surface by traversing that surface in a known raster scan pattern 32. FIG. 3 schematically depicts features 30 of such a method. The incident laser spot 20 moves over the surface in a raster scan pattern traced by the centre of the spot 12 along a line 32. The surface impinged upon by the high power density region of the spot at and within the boundary 14 scabbles. That impinged upon by the low power density region of the area of laser light 26 does not scabble but the surface is modified to varying degrees by effects such as relaxation, dehydration and chemical change. This occurs as the incident beam 20 traverses a first track 37, area 38 of the spot leaving modified, but un-scabbled surface area 36. Other surface area traversed by the low power density region of the laser light is also traversed by the higher power density region and thus scabbles.

Subsequently the laser spot traverses a second, adjacent, track 39. The surface impinged upon by the high power density region 24' of the spot 20' generally scabbles. However, surface area 36 substantially resists scabbling even though it is impinged by the high power density region 24' of the incident laser light. This is a significant disadvantage with current laser scabbling methodology.

The method of the invention relates to an improved method of treating a surface to be scabbled.

Figure 4:
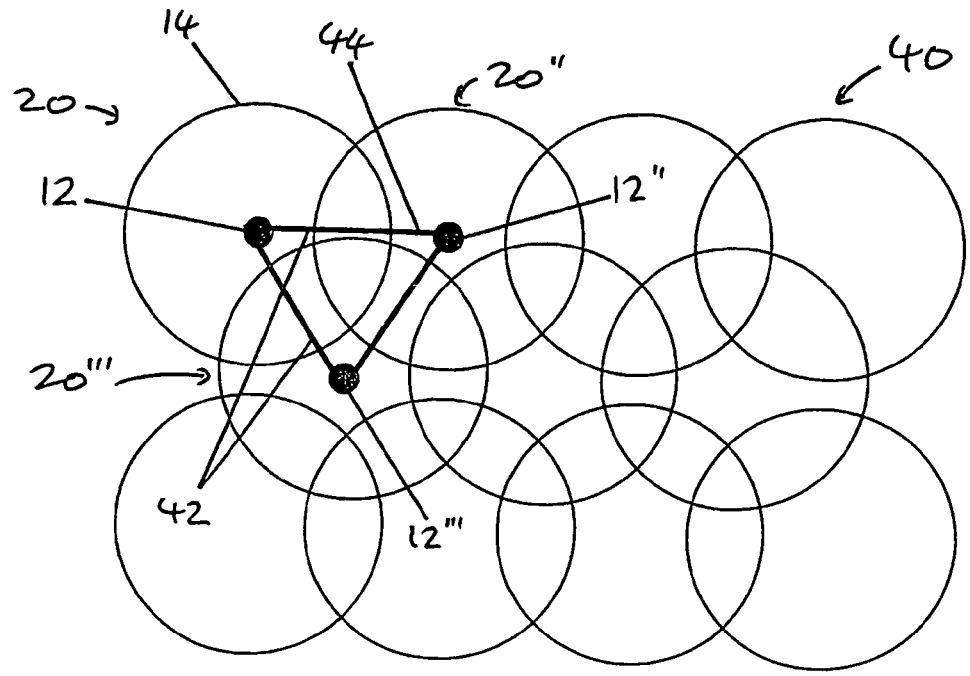
FIG. 4 shows schematically an example of a pattern of spots of laser light for scabbling a surface in accordance with the invention.

FIG. 4 shows a pattern 40 of spot irradiation for the scabbling of a surface in accordance with the invention. A laser beam (not shown) is made to momentarily impinge as a spot 20 of light on a concrete surface to be scabbled (as represented by the plane of the paper) for 15 s. The spot is then turned off, the laser moved, and a subsequent spot 20" irradiated for the same length of time in an adjacent position. The spot is then turned off and a further spot 20''', overlapping spots 20 and 20", is then irradiated. Still further spots of laser light as indicated by other circles are then irradiated. An array of spots of laser light is therefore built up as indicated. This may be visualised by identifying the centres of spots 12, 12", 12'". Joining the centres of such spots of laser light with notional lines 42 to establish a geometric shape, in this example represented as an equilateral triangle 44. This is an example of a simple geometric shape as referred to previously.

Figure 5:
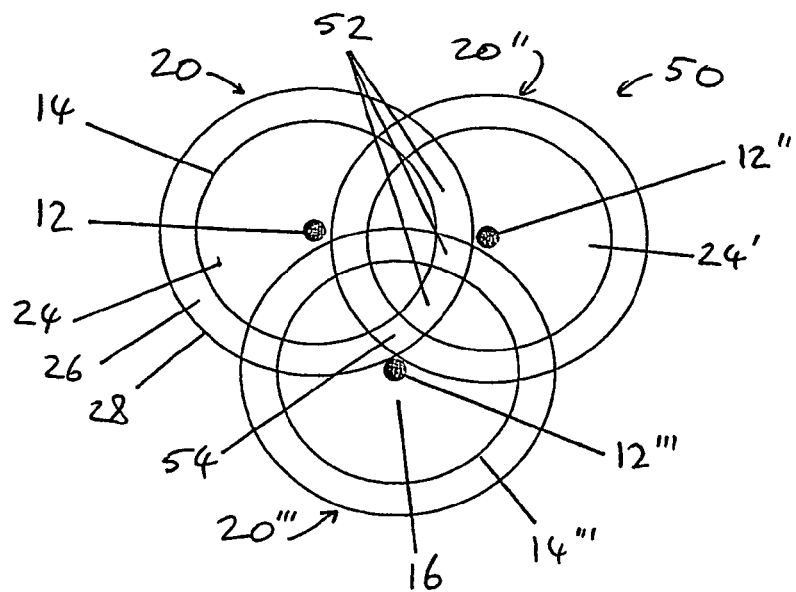

Detail of the effects of scabbling as illustrated in FIG. 4 are shown in FIG. 5. An initial spot of laser light 20 causes scabbling in area 24. Area 26, of power density below the threshold power density for scabbling may start to become modified in such a way as to inhibit scabbling. The incident laser light is then moved to a second location 20" and further scabbling in area 24' occurs. Area 24' encompasses area 52 and any difficulty in scabbling due to prior irradiation with area 26 is overcome with the high power, higher near the centre 12", area of incident laser light 24'. The relatively small area indicated at 54 is further irradiated with lower power density laser light and may become difficult to scabble. However, when the incident spot of laser light is moved to location 12'" the potentially difficult to scabble small area 54 is located near the highest power density part 16 of the laser spot 20'" and is given a higher incident power density than the threshold power density for scabbling present along boundary 14'". The method of irradiating a surface for scabbling according to the method of the invention therefore enables the highest power density region of an incident laser beam to impinge upon that part of a surface to be scabbled that is most likely to be resistant to scabbling.

As scabbling of the surface occurs with each spot a layer of the surface of the concrete is thereby systematically detached. The detached material may be ejected with some force or may be removed by conventional air pressure, vacuum or alternative methods and collected.

Figure 6:
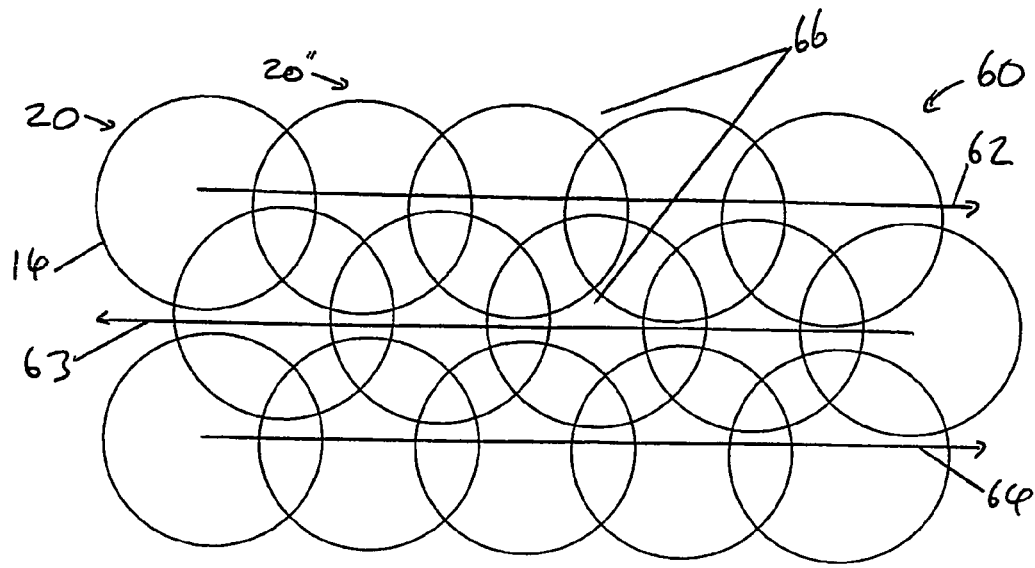
FIG. 6 shows schematically a further example of a pattern of laser light irradiation of a surface in accordance with the present invention.
Figure 7:
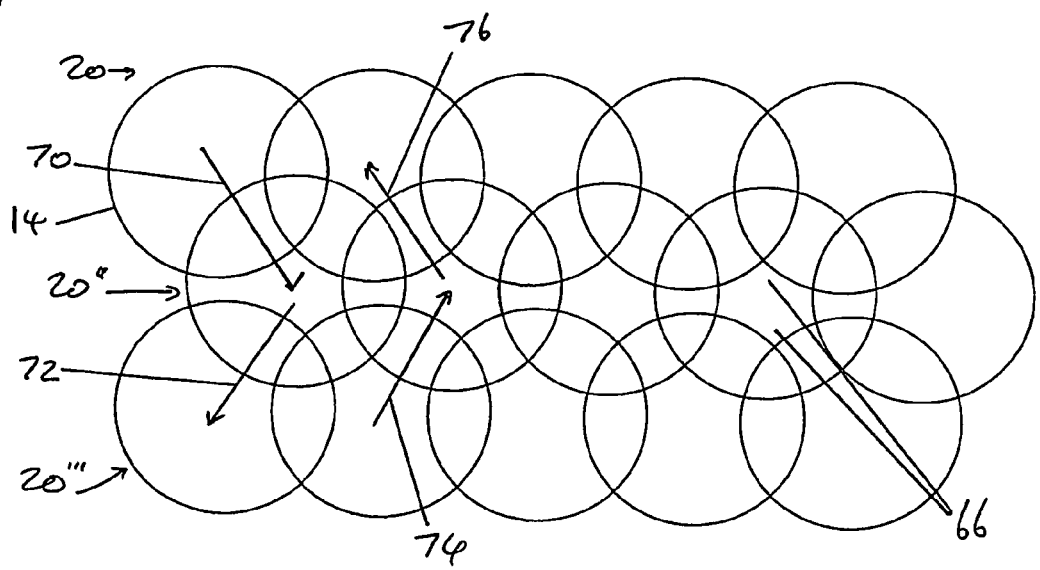
FIG. 7 shows schematically a yet further example of a pattern of laser light irradiation of a surface in accordance with the present invention.

In alternative uses of the method of the invention alternative permutations of spot irradiation sequences may be used. Examples of such sequences are illustrated in FIGS. 6 and 7. In FIG. 6 a pattern of laser spot irradiation 60 is shown. The method comprises irradiating sequential spots of light 20, 20" and so on along in an extended linear path 62 to scabble a line along the surface. A similar parallel row 63 of spots of laser light, offset by about a radius of the spots in a longitudinal direction from the first row of spots are then used to scabble the surface. Further rows, such as row 64 are then added to further scabble the surface. As the centres of the spots of laser light in a further row 63 are placed near the indentations 66 in an adjacent track 62 even scabbling of the surface occurs giving a relatively even surface and concentrating the most effective part of a laser spot for scabbling at or near regions 66 (c.f. combined regions 52 and 54) least likely to scabble.

A further pattern of irradiation of a surface with spots of laser light for effecting scabbling is shown in FIG. 7. Sequential spots of laser light 20, 20" and 20'" are used to irradiate the surface for scabbling. The sequence of spots follows the sequence indicated by lines 70, 72, 74, 76 and describes a herring-bone pattern upon the surface being scabbled. This variant of the method of the invention has the advantage that areas 66 are irradiated for scabbling soon after their creation by earlier spots of laser light in the sequence (20, 20", 20'" etc).

Figure 8:
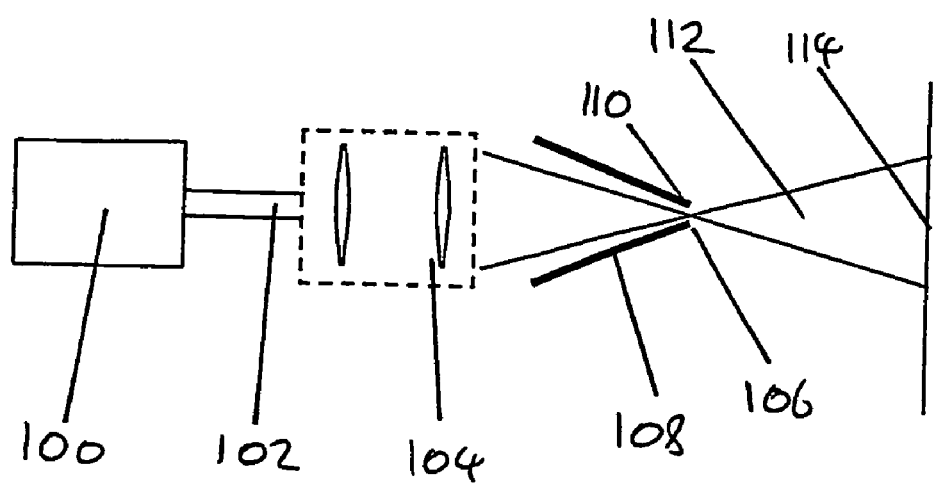
FIG. 8 which shows a schematic representation of laser equipment suitable for use in the method of the invention.

A schematic representation of laser equipment suitable for use in the method of the invention is shown in FIG. 8. A laser light source 100, emits laser light which may be channelled along a fibre optic channel 102 to focussing optics 104. The focussing optics comprise lenses to focus the laser light to a focus 106. The laser light is shrouded by a frusto-conical shroud 108, one end 110 of which surrounds the focal point of the laser light. The shroud serves to protect the optics and other components and forms part of an overall protective shroud (not shown) of the equipment. Compressed air is ejected at high velocity through the end of the shroud 110 to also stop ingress of debris such as fumes and particles. Outside the equipment the laser light diverges 112 and impinges upon a surface to be treated 114.

The laser equipment may be mounted on a robotic arm for movement about a surface to be scabbled. Alternatively a robotic arm may move a laser head for emitting laser light on to a surface to be scabbled wherein the head is connected to a stationary laser source by a fibre optic cable. Other deployment means may also be envisaged.

In use of a laser beam otherwise in accordance with the invention interruption of the laser beam, e.g. by a shutter or by turning the continuous laser on and off, such as to not significantly affect the power density requirements is still considered within the scope of the invention.

The invention claimed is:

1. A method of treating an inorganic non-metallic surface for the removal of a portion of said surface by scabbling, the method comprising the repeated sequence of steps of irradiating a first discrete location on the surface with a stationary spot of laser light having an average power density of from 30 W/cm$^2$ to 200 W/cm$^2$ for a period of from 1 s to 30 s; and then (a) moving the spot of laser light relative to the surface; or (b) moving the surface relative to the spot of laser light, so as to irradiate a second discrete location on the surface in the same manner, said moving of the spot relative to the surface or the surface relative to the spot being intermittent such that the time interval between irradiation of successive discrete locations on the surface by the spot of laser light is between 0.1 s and 2 s.

2. A method according to claim 1 wherein the laser light source is switched off between irradiation of successive discrete locations on the surface.

3. A method according to claim 1 wherein the laser light beam is interrupted, between irradiation of successive discrete locations on the surface.

4. A method according to claim 1 wherein the discrete locations on the surface irradiated by respective spots of laser light overlap each other.

5. A method according to claim 4 wherein the extent of overlap of the discrete locations on the surface irradiated by the spot of laser light is such that no area which is not at one time during use of the method exposed to laser light is present between said locations.

6. A method according to claim 1 wherein successive discrete locations on the surface irradiated by the spot of laser light are arranged in a geometric pattern.

7. A method according to claim 6 wherein the geometric pattern is that of the corners of a figure chosen from the group consisting of triangles, rectangles, rhombi, pentagons, and hexagons.

8. A method according to claim 1 wherein the spot of laser light defined as an area of laser light, incident upon a surface which is above a threshold power density level for causing scabbling is circular; and wherein a distance between the centers of locations irradiated by the spot of laser light is in the range $4/7$ to $6/7$ of the diameter of the circular spot of laser light.

9. A method according to claim 1 wherein the duration of irradiation of each discrete location on the surface by the spot of laser light is more than five times longer than the time interval between irradiation of successive discrete locations on the surface by the spot of laser light.

* * * * *